United States Patent [19]

Lindenberg

[11] 4,312,537
[45] Jan. 26, 1982

[54] VEHICLE SEATS

[75] Inventor: Wilhelm Lindenberg, Wiedensahl, Fed. Rep. of Germany

[73] Assignee: P. A. Rentrop, Hubbert & Wagner Fahrzeugausstattungen GmbH & Co., KG, Stadthagen, Fed. Rep. of Germany

[21] Appl. No.: 102,928

[22] Filed: Dec. 12, 1979

[30] Foreign Application Priority Data

Dec. 15, 1978 [DE] Fed. Rep. of Germany ....... 2854217

[51] Int. Cl.³ .............................................. A47C 1/032
[52] U.S. Cl. .................... 297/317; 297/341; 297/379
[58] Field of Search ............... 297/317, 321, 320, 322, 297/341, 379

[56] References Cited

U.S. PATENT DOCUMENTS 2,343,739  3/1944  Bernstein ............................ 297/341
4,131,316  12/1978  Pallant et al. ...................... 297/341

FOREIGN PATENT DOCUMENTS 75594   5/1976  Australia ............................. 297/341
2376008 9/1978  France ................................ 297/341
501356  11/1954 Italy .................................... 297/322

Primary Examiner—William E. Lyddane
Attorney, Agent, or Firm—Mason, Mason & Albright

[57] ABSTRACT

A vehicle seat includes a subframe arranged to be secured to the vehicle floor and an upper frame mounted on the subframe by four pivotal levers to form two pairs of parallelogram linkages and so constrain movement of the upper frame relative to the lower frame along an arcuate path.

A pair of mounting plates carrying a back rest are pivotally secured to opposite sides of the upper frame. A pair of control levers couple the mounting plates to respective levers in a manner such that when the mounting plates are pivoted by tilting the back rest forward into a horizontal attitude, the upper frame is caused to move along its arcuate path and so draw the back rest forward to allow greater access to the area behind the back rest.

9 Claims, 4 Drawing Figures

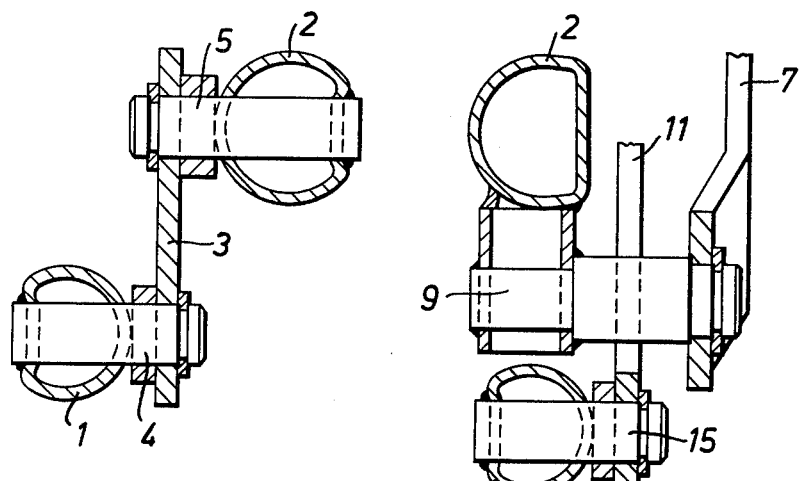
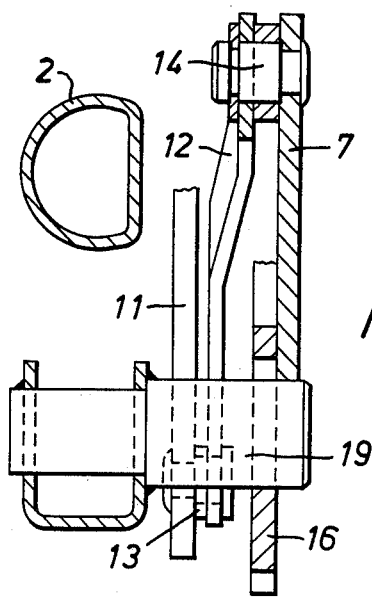

VEHICLE SEATS

BACKGROUND OF THE INVENTION

1. Field of the Invention

The present invention relates to seats for motor vehicles for example.

2. Description of the Prior Art

In two door motor vehicles having front and rear seats, the back rests of the front seats must be tilted to allow passengers to gain access to the rear seats. In such arrangements the access space is usually limited and this makes it particularly difficult for corpulent persons to gain access to and from the rear seats.

It is an object of the invention to increase the access space to facilitate the entry for passengers in the rear seats.

SUMMARY OF THE INVENTION

According to the invention there is provided a seat comprising a sub-frame, and upper frame mounted on the sub-frame and arranged to support a seat portion, a back portion, a pair of mounting members supporting the back portion and being pivotally secured to the upper frame, a pair of linkages each being pivotally secured at one end portion to the sub-frame at locations adjacent the back portion and being pivotally secured at the other end portion to a corresponding one of the mounting members, each linkage being arranged to displace the upper frame longitudinally of the sub-frame in response to pivoting of the mounting members, and a pair of constraining levers coupling the sub-frame and upper frame at positions remote from the back rest whereby to constrain the upper frame for limited longitudinal displacement with respect to the sub-frame.

According to the invention there is further provided a seat comprising a sub-frame, an upper frame, lying above the sub-frame, two pairs of levers one pair located on each of two opposite sides of the sub-frame and upper frame and pivotally coupled to both sub-frame and upper frame to form with the sub-frame and upper frame two pairs of parallelogram linkages to constrain the upper frame for vertical and longitudinal movement with respect to the sub-frame along a generally arcuate path, pair of mounting members supporting a back rest portion, each mounting member being pivotally secured to a corresponding one of the sides of the upper frame adjacent one end of the upper frame, and pair of control levers located on opposite sides of the upper frame, each control lever being pivotally connected to a corresponding mounting plate on that side and also to one of said pair of levers on that side, whereby to cause the upper frame to move along the arcuate path relative to the sub-frame when the back rest is displaced to cause the mounting members to pivot relative to the upper frame.

BRIEF DESCRIPTION OF THE DRAWINGS

A vehicle seat embodying the invention will now be described, by way of example, with reference to the accompanying diagrammatic drawings, in which:

FIG. 2 is a section to an enlarged scale taken on the line II—II of FIG. 1;

FIG. 3 is a section to an enlarged scale taken on the line III—III of FIG. 1; and FIG. 4 is a section to an enlarged scale taken on the line IV—IV of FIG. 1.

Figure 1:
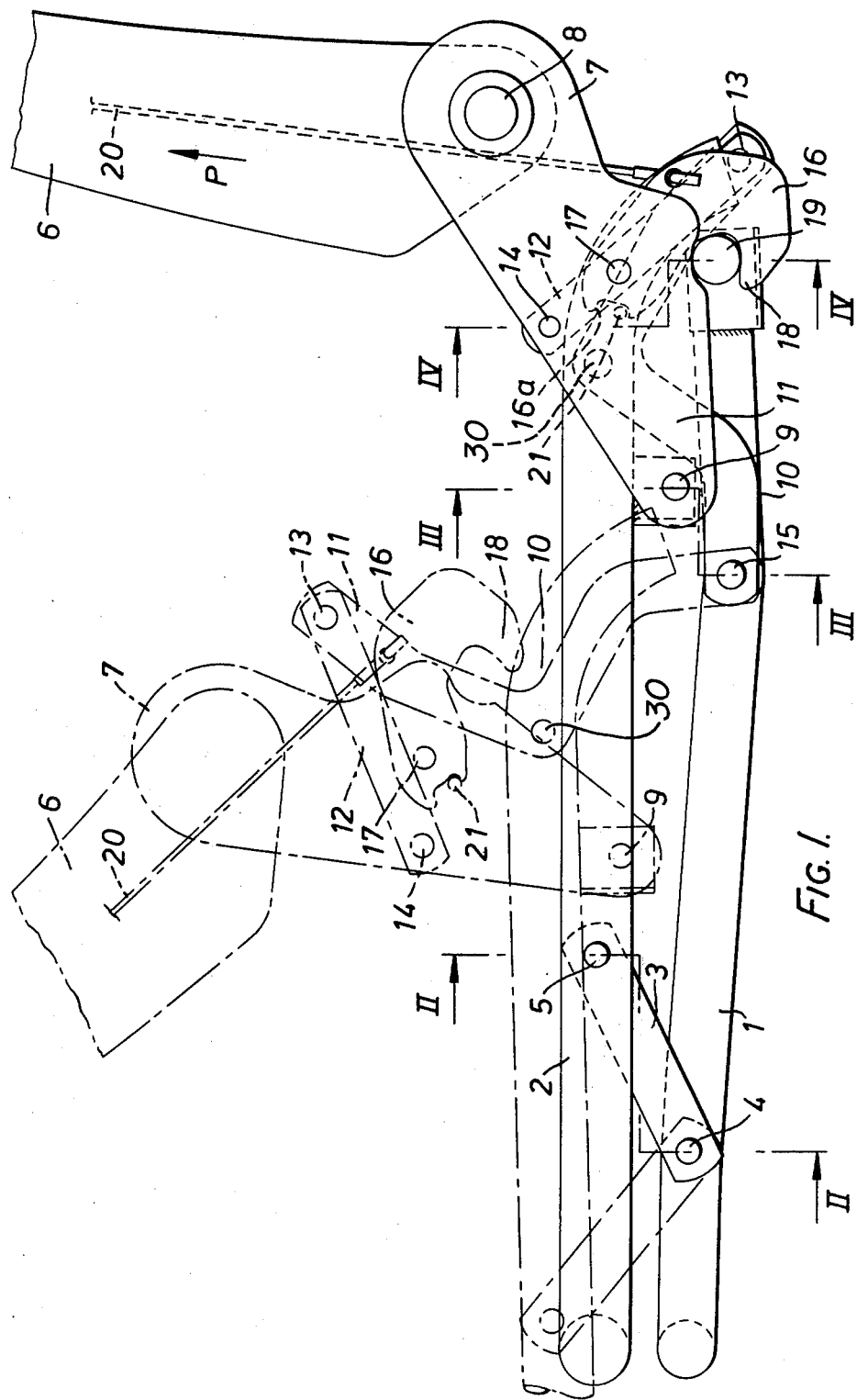
FIG. 1 is a fragmentary side elevation of the seat.

The vehicle seat to be described is of the type used as a front seat in a two door motor car. The seat has a seat portion and a back portion. The back portion is releasable to pivot forwardly and so facilitates the access of passengers to the rear seats of the motorcar.

As shown in FIG. 1, the seat has a sub-frame 1 and an upper frame 2. The upper frame 2 is arranged to carry an upholstered seat portion (not shown) incorporating springs.

The sub-frame 1 and upper frame 2 are coupled on each side of the seat portion by a corresponding lever 3. Each lever 3 is connected at one end portion by a pivot 4 to the sub-frame 1 and at its opposite end portion by a pivot 5 to the upper frame 2.

The seat has a back portion 6 which is pivotally secured to and lies between a pair of mounting members comprising plates 7.

Each mounting plate 7 is of generally triangular configuration and is coupled to the underside of the upper frame 2 by a respective bearing 9. A pair of lever mechanisms 10 are provided each associated with a corresponding plate 7. Each lever mechanism 10 has a lever 11 and a control lever 12, the lever 11 being angular and the lever 12 being rectilinear.

The two levers 11 and 12 have a common hinged joint 13. The lever 11 which is in the form of a bell crank is connected to the upper frame by a pivot 30. The end portion of the rectilinear lever 12 remote from the joint 13 is secured to the plate 7 by pivot 14 while the end portion of the lever 11 remote from the joint 13 is secured to the sub-frame 1 by a pivot 15.

A locking lever 16 is pivotally secured to the plate 7 by a pivot 17. The end portion 18 of the locking lever 16 remote from the pivot 17 is generally hook-shaped and when in its locking position is arranged to hook onto a lug 19 rigid with the sub-frame 1 thereby locking the upper frame 2 to the sub-frame 1.

Movement of the locking lever 16 is controlled by a cable release mechanism in the form of a cable secured at one end to the locking lever 16 and at its other end to release lever (not shown) mounted on the back portion 6.

An abutment 21 rigid with the plate 7 engages an elongate recess 16a in the locking lever to limit the amount by which the locking lever 16 can pivot with respect to the plate.

In operation, the vehicle seat normally occupies the position shown in FIG. 1 in solid lines.

In order to gain access to or from the back seat of the vehicle the cable release mechanism is actuated to cause the cable to be drawn upwardly in the direction of the arrow P (FIG. 1). As a result the locking lever 16 is pivoted in a counterclockwise sense until the hook portion 18 is released from engagement with the lug 19. Then the back seat 6 in FIG. 1 displaced by pivoting it in a counterclockwise sense with the result that, together with the plates 7, it is moved into the position shown in broken lines. As each mounting plate 7 is connected to the upper frame 2 by a corresponding bearing, the upper frame 2 is raised as the mounting plate 7 pivots and at the same time is pushed forward, as shown in FIG. 1 into the position shown in broken lines. Sub-frame 1, however, does not change its position.

Because of the forward movement of the back portion 6, the mounting plates 7, the lever mechanism 10 and the upper frame 2 a large amount of free space is created to provide easy access to and from the back seats of the vehicle, and this is particularly of benefit to corpulent persons.

When rear seats of the motor vehicle are occupied, the back portion 6 is pivoted in a clockwise sense and the individual parts of seat return to the positions shown in solid lines in FIG. 1 with the locking lever 16 back in its locking position.

The seat can of course incorporate seat height and inclination adjustment devices.

Having disclosed my invention, what I claim as new and to be secured by Letters Patent of the United States is:

1. In a vehicle seat
   a sub-frame,
   an upper seat-portion-carrying frame mounted on the sub-frame,
   a back portion,
   a pair of mounting members supporting the back portion and being pivotally secured to the upper frame,
   a pair of constraining levers coupling the sub-frame and upper frame at positions remote from the back portion whereby to constrain the upper frame for limited longitudinal displacement with respect to the sub-frame, and
   a pair of linkages,
   each linkage including a bell crank, a lever, and securing means pivotally securing one end portion of the bell crank to the sub-frame, pivotally securing an intermediate portion of the bell crank to the upper frame, pivotally securing the other end portion of the bell crank to one end of the lever, and pivotally securing the other end of the lever to the mounting member,
   each linkage being arranged to displace the upper frame longitudinally of the sub-frame in response to pivoting of the mounting members.

2. A seat according to claim 1, wherein each constraining lever is rectilinear.

3. A seat according to claim 2, including a generally hook-shaped lever pivotally secured to one said mounting plate and arranged to engage a lug rigid with the sub-frame when the back rest is in a generally upright position thereby locking the upper frame to the sub-frame.

4. A seat according to claim 3, including release means for releasing the locking lever from engagement with the lug.

5. A seat according to claim 3, including abutment means on the mounting member carrying the locking lever for limiting the range of pivotal movement of the locking lever with respect to the mounting member.

6. In a vehicle seat,
   a sub-frame,
   an upper frame lying above the sub-frame,
   two pairs of substantially parallel levers one pair located on each of two opposite sides of the sub-frame and upper frame and pivotally coupled to both sub-frame and upper frame to form with the sub-frame and upper frame two pairs of substantially parallelogram linkages to constrain the upper frame for vertical and longitudinal movement with respect to the sub-frame along a generally arcuate path,
   the rearmost of said pair of levers each having an extension which extends beyond its pivotal coupling to said upper frame,
   a back rest portion,
   a pair of mounting members supporting the lower end portion of the back rest portion, each mounting member being pivotally secured to a corresponding one of the sides of the upper frame adjacent one end of the upper frame at a location such that pivotal movement of the mounting members effects bodily displacement of the said lower end portion in the same longitudinal direction as the upper frame, and
   a pair of control levers located on opposite sides of the upper frame, each said control lever being pivotally connected to a corresponding said mounting member on that side and also to the respective said extension of each of said rearmost pair of levers, whereby to cause the upper frame to move along the arcuate path relative to the sub-frame when the back rest is displaced to cause the mounting members to pivot relative to the upper frame.

7. A seat according to claim 4, including a generally hook-shaped locking lever pivotally secured to one said mounting plate and arranged to engage a lug rigid with the sub-frame when the back rest is in a generally upright position thereby locking the upper frame to the sub-frame.

8. A seat according to claim 6, including release means for releasing the locking lever from engagement with the lug.

9. A vehicle seat according to claim 6, including abutment means on the mounting member carrying the locking lever for limiting the range of pivotal movement of the locking lever with respect of the mounting member.

* * * * *